US010826933B1

(12) United States Patent
Ismael et al.

(10) Patent No.: US 10,826,933 B1
(45) Date of Patent: Nov. 3, 2020

(54) TECHNIQUE FOR VERIFYING EXPLOIT/MALWARE AT MALWARE DETECTION APPLIANCE THROUGH CORRELATION WITH ENDPOINTS

(71) Applicant: FireEye, Inc., Milpitas, CA (US)

(72) Inventors: Osman Abdoul Ismael, Palo Alto, CA (US); Ashar Aziz, Coral Gables, FL (US)

(73) Assignee: FireEye, Inc., Milpitas, CA (US)

( * ) Notice: Subject to any disclaimer, the term of this patent is extended or adjusted under 35 U.S.C. 154(b) by 4 days.

(21) Appl. No.: 15/258,656

(22) Filed: Sep. 7, 2016

Related U.S. Application Data

(60) Provisional application No. 62/316,427, filed on Mar. 31, 2016, provisional application No. 62/316,390, filed on Mar. 31, 2016.

(51) Int. Cl.
*H04L 29/06* (2006.01)
*G06F 21/53* (2013.01)

(52) U.S. Cl.
CPC ............ *H04L 63/145* (2013.01); *G06F 21/53* (2013.01); *H04L 63/0245* (2013.01); *G06F 2221/033* (2013.01)

(58) Field of Classification Search
CPC ... H04L 63/145; H04L 63/0245; G06F 21/53; G06F 2221/033
See application file for complete search history.

(56) References Cited

U.S. PATENT DOCUMENTS

| 6,321,338 | B1 * | 11/2001 | Porras | H04L 41/142 709/224 |
| 6,978,015 | B1 * | 12/2005 | Erickson | H04M 3/18 375/254 |
| 7,188,367 | B1 * | 3/2007 | Edwards | G06F 21/566 709/207 |
| 7,600,007 | B1 * | 10/2009 | Lewis | G06Q 10/04 709/223 |
| 7,836,500 | B2 * | 11/2010 | Nason | G06F 21/568 713/188 |
| 8,042,178 | B1 | 10/2011 | Fisher et al. | |

(Continued)

OTHER PUBLICATIONS

U.S. Appl. No. 15/473,154, filed Mar. 29, 2017 Non-Final Office Action dated Nov. 29, 2018.

*Primary Examiner* — David Garcia Cervetti
(74) *Attorney, Agent, or Firm* — Rutan & Tucker, LLP

(57) ABSTRACT

A technique verifies a determination of an exploit or malware in an object at a malware detection system (MDS) appliance through correlation of behavior activity of the object running on endpoints of a network. The appliance may analyze the object to render a determination that the object is suspicious and may contain the exploit or malware. In response, the MDS appliance may poll the endpoints (or receive messages pushed from the endpoints) to determine as to whether any of the endpoints may have analyzed the suspect object and observed its behaviors. If the object was analyzed, the endpoints may provide the observed behavior information to the appliance, which may then correlate that information, e.g., against correlation rules, to verify its determination of the exploit or malware. In addition, the appliance may task the endpoints to analyze the object, e.g., during run time, to determine whether it contains the exploit and provide the results to the appliance for correlation.

33 Claims, 6 Drawing Sheets

(56) References Cited

U.S. PATENT DOCUMENTS

| | | | | |
|---|---|---|---|---|
| 8,056,136 B1* | 11/2011 | Zaitsev | G06F 21/56 | 726/24 |
| 8,555,388 B1* | 10/2013 | Wang | H04L 63/1416 | 726/23 |
| 8,782,790 B1* | 7/2014 | Smith | H04L 63/1416 | 726/24 |
| 8,813,222 B1* | 8/2014 | Codreanu | G06F 21/56 | 726/22 |
| 8,850,584 B2* | 9/2014 | Alme | G06F 21/552 | 726/22 |
| 8,854,474 B2* | 10/2014 | Blumstein-Koren | G06F 16/7837 | 348/169 |
| 9,092,616 B2* | 7/2015 | Kumar | G06F 21/52 | |
| 9,094,443 B1* | 7/2015 | Martini | G06F 16/9566 | |
| 9,148,441 B1* | 9/2015 | Tamersoy | H04L 63/1416 | |
| 9,166,997 B1* | 10/2015 | Guo | H04L 63/1433 | |
| 9,171,154 B2* | 10/2015 | Pereira | G06F 21/56 | |
| 9,176,843 B1* | 11/2015 | Ismael | G06F 11/362 | |
| 9,202,050 B1* | 12/2015 | Nachenberg | G06F 21/56 | |
| 9,203,862 B1 | 12/2015 | Kashyap et al. | | |
| 9,223,972 B1 | 12/2015 | Vincent et al. | | |
| 9,280,663 B2* | 3/2016 | Pak | G06F 21/56 | |
| 9,282,116 B1* | 3/2016 | Rovniaguin | H04L 63/1458 | |
| 9,332,029 B1* | 5/2016 | Tikhonov | H04L 63/145 | |
| 9,401,142 B1* | 7/2016 | Rothwell | G06Q 50/01 | |
| 9,578,064 B2* | 2/2017 | Lango | H04L 41/5019 | |
| 9,635,039 B1* | 4/2017 | Islam | H04L 63/1408 | |
| 9,635,041 B1* | 4/2017 | Warman | H04L 41/50 | |
| 9,641,544 B1* | 5/2017 | Treat | H04L 63/1425 | |
| 9,734,138 B2* | 8/2017 | Rothwell | G06F 40/30 | |
| 9,749,294 B1* | 8/2017 | Marquardt | H04L 63/0272 | |
| 9,838,405 B1* | 12/2017 | Guo | H04L 63/1416 | |
| 9,912,681 B1* | 3/2018 | Ismael | H04L 63/1466 | |
| 10,178,119 B1* | 1/2019 | Brandwine | H04L 63/1433 | |
| 10,200,866 B1* | 2/2019 | Cratsenburg | H04W 12/08 | |
| 10,333,962 B1* | 6/2019 | Brandwine | H04L 63/1425 | |
| 10,454,950 B1* | 10/2019 | Aziz | H04L 63/145 | |
| 10,642,753 B1* | 5/2020 | Steinberg | G06F 21/56 | |
| 2002/0194489 A1* | 12/2002 | Almogy | H04L 63/1491 | 726/24 |
| 2004/0024767 A1* | 2/2004 | Chen | H04L 41/0631 | |
| 2004/0133672 A1* | 7/2004 | Bhattacharya | H04L 63/1416 | 709/224 |
| 2005/0060562 A1* | 3/2005 | Bhattacharya | H04L 63/1416 | 726/26 |
| 2006/0101264 A1* | 5/2006 | Costea | G06F 21/566 | 713/165 |
| 2006/0101282 A1* | 5/2006 | Costea | G06F 21/56 | 713/188 |
| 2006/0137012 A1 | 6/2006 | Aaron | | |
| 2006/0156380 A1* | 7/2006 | Gladstone | H04L 63/145 | 726/1 |
| 2007/0008098 A1* | 1/2007 | Wong | G06F 21/552 | 340/506 |
| 2007/0038677 A1* | 2/2007 | Reasor | G06F 21/565 | |
| 2007/0089165 A1* | 4/2007 | Wei | H04L 63/104 | 726/4 |
| 2007/0121596 A1* | 5/2007 | Kurapati | H04M 7/0078 | 370/356 |
| 2007/0130319 A1* | 6/2007 | Tse | H04L 67/16 | 709/224 |
| 2007/0209074 A1* | 9/2007 | Coffman | H04L 63/145 | 726/23 |
| 2007/0256127 A1* | 11/2007 | Kraemer | H04L 63/20 | 726/23 |
| 2008/0244742 A1* | 10/2008 | Neystadt | H04L 63/308 | 726/23 |
| 2009/0282478 A1* | 11/2009 | Jiang | H04L 63/1416 | 726/22 |
| 2010/0094459 A1* | 4/2010 | Cho | G05D 1/0291 | 700/248 |
| 2011/0047597 A1* | 2/2011 | Mahaffey | G06F 21/564 | 726/3 |
| 2011/0047620 A1* | 2/2011 | Mahaffey | H04L 63/1441 | 726/23 |
| 2011/0055925 A1* | 3/2011 | Jakobsson | G06F 21/552 | 726/25 |
| 2011/0145920 A1* | 6/2011 | Mahaffey | H04L 63/1416 | 726/22 |
| 2012/0036576 A1* | 2/2012 | Iyer | H04L 63/1441 | 726/23 |
| 2012/0254995 A1* | 10/2012 | Sallam | G06F 21/566 | 726/22 |
| 2012/0255001 A1* | 10/2012 | Sallam | G06F 21/566 | 726/23 |
| 2012/0255003 A1* | 10/2012 | Sallam | G06F 21/554 | 726/23 |
| 2012/0255004 A1* | 10/2012 | Sallam | G06F 21/554 | 726/23 |
| 2012/0255012 A1* | 10/2012 | Sallam | H04L 63/145 | 726/24 |
| 2012/0255013 A1* | 10/2012 | Sallam | G06F 21/564 | 726/24 |
| 2012/0304244 A1* | 11/2012 | Xie | G06F 21/53 | 726/1 |
| 2013/0042294 A1* | 2/2013 | Colvin | H04L 63/145 | 726/1 |
| 2013/0086247 A1* | 4/2013 | Burckart | H04L 67/2823 | 709/224 |
| 2013/0097706 A1* | 4/2013 | Titonis | H04W 12/12 | 726/24 |
| 2013/0145463 A1* | 6/2013 | Ghosh | G06F 21/53 | 726/22 |
| 2013/0298192 A1* | 11/2013 | Kumar | G06F 21/52 | 726/3 |
| 2013/0305369 A1* | 11/2013 | Karta | H04L 63/1416 | 726/23 |
| 2014/0007238 A1* | 1/2014 | Magee | H04L 63/1408 | 726/24 |
| 2014/0013434 A1* | 1/2014 | Ranum | H04L 61/1511 | 726/24 |
| 2014/0137180 A1* | 5/2014 | Lukacs | G06F 21/53 | 726/1 |
| 2014/0157405 A1* | 6/2014 | Joll | H04L 63/1425 | 726/22 |
| 2014/0215608 A1* | 7/2014 | Rajagopalan | G06Q 10/101 | 726/22 |
| 2014/0245374 A1* | 8/2014 | Deerman | F01D 3/04 | 726/1 |
| 2014/0283066 A1* | 9/2014 | Teddy | G06F 21/56 | 726/23 |
| 2014/0289323 A1* | 9/2014 | Kutaragi | H04L 67/42 | 709/203 |
| 2014/0337862 A1* | 11/2014 | Valencia | G06F 21/567 | 719/313 |
| 2014/0373155 A1* | 12/2014 | Whitehouse | G06F 21/53 | 726/24 |
| 2015/0007325 A1* | 1/2015 | Eliseev | G06F 21/566 | 726/24 |
| 2015/0047046 A1* | 2/2015 | Pavlyushchik | H04L 63/1433 | 726/25 |
| 2015/0067862 A1* | 3/2015 | Yu | H04L 63/1491 | 726/24 |
| 2015/0067866 A1* | 3/2015 | Ibatullin | H04L 63/1466 | 726/25 |
| 2015/0074806 A1* | 3/2015 | Roundy | H04L 63/1433 | 726/23 |
| 2015/0101047 A1* | 4/2015 | Sridhara | H04L 63/1433 | 726/23 |
| 2015/0101048 A1* | 4/2015 | Sridhara | H04L 63/145 | 726/23 |
| 2015/0106942 A1* | 4/2015 | Borghetti | G06F 21/577 | 726/25 |
| 2015/0121524 A1* | 4/2015 | Fawaz | G06F 21/552 | 726/23 |
| 2015/0150130 A1* | 5/2015 | Fiala | G06F 21/56 | 726/23 |

(56) References Cited

U.S. PATENT DOCUMENTS

| | | | |
|---|---|---|---|
| 2015/0161386 A1* | 6/2015 | Gupta | G06N 5/043 726/23 |
| 2015/0163121 A1* | 6/2015 | Mahaffey | H04L 63/1425 707/687 |
| 2015/0205962 A1* | 7/2015 | Swidowski | G06F 21/554 726/23 |
| 2015/0220734 A1* | 8/2015 | Nalluri | G06F 21/6218 726/23 |
| 2015/0220735 A1* | 8/2015 | Paithane | G06F 21/53 726/23 |
| 2015/0244730 A1 | 8/2015 | Vu et al. | |
| 2015/0288659 A1* | 10/2015 | Lukacs | G06F 21/575 713/2 |
| 2015/0327518 A1* | 11/2015 | Han | A01K 29/005 348/143 |
| 2015/0365427 A1* | 12/2015 | Ben-Shalom | H04L 63/1441 726/23 |
| 2016/0019388 A1* | 1/2016 | Singla | H04L 63/1416 726/23 |
| 2016/0034361 A1* | 2/2016 | Block | H04L 63/1416 714/4.12 |
| 2016/0065601 A1* | 3/2016 | Gong | G06F 21/552 726/23 |
| 2016/0078225 A1* | 3/2016 | Ray | G06F 21/552 726/23 |
| 2016/0078229 A1* | 3/2016 | Gong | G06F 21/561 726/24 |
| 2016/0078347 A1* | 3/2016 | Salajegheh | G06F 11/3452 706/12 |
| 2016/0080345 A1* | 3/2016 | Safruti | G06F 21/552 726/6 |
| 2016/0080413 A1* | 3/2016 | Smith | H04L 63/1458 726/23 |
| 2016/0080417 A1* | 3/2016 | Thomas | H04L 63/20 726/1 |
| 2016/0080418 A1* | 3/2016 | Ray | H04L 63/20 726/1 |
| 2016/0080420 A1* | 3/2016 | Ray | G06F 16/285 726/1 |
| 2016/0092682 A1* | 3/2016 | Adams | G06F 21/566 726/23 |
| 2016/0099963 A1* | 4/2016 | Mahaffey | H04W 12/02 726/25 |
| 2016/0112451 A1* | 4/2016 | Jevans | G06F 21/51 726/25 |
| 2016/0127367 A1* | 5/2016 | Jevans | G06F 21/554 713/152 |
| 2016/0127406 A1* | 5/2016 | Smith | H04L 63/1458 726/23 |
| 2016/0142432 A1* | 5/2016 | Manadhata | H04L 63/14 726/25 |
| 2016/0164960 A1* | 6/2016 | Marinelli | H04L 67/104 709/201 |
| 2016/0173509 A1* | 6/2016 | Ray | H04L 63/1425 726/23 |
| 2016/0173510 A1* | 6/2016 | Harris | H04L 63/02 726/23 |
| 2016/0191465 A1* | 6/2016 | Thomas | H04L 63/20 726/1 |
| 2016/0191550 A1* | 6/2016 | Ismael | H04L 63/1416 726/1 |
| 2016/0205138 A1* | 7/2016 | Krishnaprasad | H04L 63/20 726/1 |
| 2016/0232353 A1* | 8/2016 | Gupta | G06F 21/552 |
| 2016/0253498 A1* | 9/2016 | Valencia | G06F 21/577 726/23 |
| 2016/0285897 A1* | 9/2016 | Gantman | G06F 21/552 |
| 2016/0285914 A1* | 9/2016 | Singh | H04L 63/1416 |
| 2016/0301704 A1* | 10/2016 | Hassanzadeh | H04L 63/1433 |
| 2016/0301709 A1* | 10/2016 | Hassanzadeh | H04L 63/1408 |
| 2016/0314298 A1* | 10/2016 | Martini | G06F 21/53 |
| 2016/0323295 A1 | 11/2016 | Joram et al. | |
| 2016/0359890 A1* | 12/2016 | Deen | G06F 9/45558 |
| 2016/0379136 A1* | 12/2016 | Chen | G06F 21/566 706/12 |
| 2016/0381057 A1* | 12/2016 | Das | H04L 43/0817 726/23 |
| 2017/0017537 A1* | 1/2017 | Razin | G06F 11/321 |
| 2017/0026949 A1* | 1/2017 | Ouyang | H04L 67/22 |
| 2017/0046510 A1* | 2/2017 | Chen | G06F 21/552 |
| 2017/0083705 A1* | 3/2017 | Lee | G06F 21/566 |
| 2017/0093899 A1* | 3/2017 | Horesh | G06N 5/04 |
| 2017/0118241 A1* | 4/2017 | Call | H04L 67/02 |
| 2017/0149804 A1* | 5/2017 | Kolbitsch | H04L 63/1441 |
| 2017/0195347 A1* | 7/2017 | Hay | G06F 21/53 |
| 2017/0223046 A1* | 8/2017 | Singh | H04L 63/1491 |
| 2017/0243000 A1* | 8/2017 | Shraim | H04L 9/00 |
| 2017/0249560 A1* | 8/2017 | Cudak | G06F 21/554 |
| 2017/0272453 A1* | 9/2017 | Murray | G06F 21/552 |
| 2017/0316206 A1* | 11/2017 | Zou | G06F 21/56 |
| 2018/0048660 A1* | 2/2018 | Paithane | H04L 63/1416 |
| 2018/0176247 A1* | 6/2018 | Smith | H04L 63/1458 |

* cited by examiner

TECHNIQUE FOR VERIFYING EXPLOIT/MALWARE AT MALWARE DETECTION APPLIANCE THROUGH CORRELATION WITH ENDPOINTS

RELATED APPLICATION

The present application claims priority from commonly owned Provisional Patent Application No. 62/316,427, entitled TECHNIQUE FOR VERIFYING EXPLOIT/MALWARE AT MALWARE DETECTION APPLIANCE THROUGH CORRELATION WITH ENDPOINTS, filed on Mar. 31, 2016, and from commonly owned Provisional Patent Application No. 62/316,390, entitled MALWARE DETECTION VERIFICATION AND ENHANCEMENT USING DETECTION SYSTEMS LOCATED AT THE NETWORK PERIPHERY AND ENDPOINT DEVICES, filed on Mar. 31, 2016 the contents of which are incorporated herein by reference.

BACKGROUND

Technical Field

The present disclosure relates to malware detection systems and, more specifically, to verification of exploit or malware at a malware detection system appliance of a network.

Background Information

Data communication in a network involves the exchange of data between two or more entities interconnected by communication links and sub-networks (segments). The entities are typically software processes executing in operating systems of computers, such as end nodes and intermediate nodes. The intermediate nodes interconnect the communication links and segments to enable transmission of data between the end nodes. A local area network (LAN) is an example of segment that provides relatively short distance communication among the interconnected nodes, whereas a wide area network (WAN) enables long distance communication over links provided by telecommunications facilities. The Internet is an example of a WAN that connects disparate computer networks throughout the world, providing global communication between nodes on various networks.

Malicious software (malware) has become a pervasive problem for nodes coupled to networks, such as the Internet. Malware is often embedded within downloadable content intended to adversely influence or attack normal operations of a node. Whereas operating system vulnerabilities have traditionally been common targets of such malware content, attackers have broadened their attack to exploit vulnerabilities in processes or applications, such as web browsers. For example, malware content may be embedded within objects associated with a web page hosted by a malicious web site.

Various types of security enhanced nodes, such as security appliances, are often deployed at different segments of the networks. These security appliances often employ virtualization systems to provide the enhanced security needed to uncover the presence of malware embedded within ingress content propagating over the different segments. Specifically, detection at the network periphery may be limited by the capability of the malware detection system for precise and effective detection without excessive false positives (wrongly identified attacks) on the one hand (such as is often the case with intrusion detection systems), and for timely analysis of behaviors of the network traffic to completely prevent network intrusion on the other (such as is typically the case with security appliances). Furthermore, the analysis at the network periphery may not provide sufficient information about the particular target or targets (e.g., endpoints) within the network and the potential scope and severity of an attack. Various types of security appliances typically operate without any mutual relationship or correlation among the virtualization systems. Thus, knowledge of malware identities (i.e., signatures) are typically not shared among the virtualization systems, resulting in untimely and inaccurate determination of whether the ingress content includes malware (i.e., re-identify the malware).

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments herein provide a technique for verifying a determination of an exploit or malware in an object at a malware detection system (MDS) appliance through correlation of activity, i.e., behaviors, of the object running on endpoints of a network. The MDS appliance may be illustratively positioned within the network to intercept communication traffic directed to the endpoints coupled to a segment of the network. The object may be included within, e.g., a payload of a packet associated with the communication traffic. The appliance may analyze the object to render a determination that the object is suspicious and may contain the exploit or malware. In response, the MDS appliance may pull from (e.g., poll) the endpoints or receive a push from (e.g., messages) the endpoints so as to determine whether any of the endpoints may have analyzed the suspect object and observed its behaviors. If the object was analyzed, the endpoints may provide the observed behavior information to the appliance, which may then correlate that information, e.g., against correlation rules, to verify its determination of the exploit or malware. In addition, the appliance may task the endpoints to analyze the object, e.g., during run time, to determine whether it contains the exploit and provide the results to the appliance for correlation. Accordingly, the MDS appliance may verify its determination of an exploit in the object through correlation with the endpoints.

In an embodiment, the appliance may poll a selected group of endpoints in order to collect additional behavior information of the suspect object and correlate that information against a set of correction rules to provide a high level view of the exploit and any potential spreading of the exploit or malware (e.g., as an infection) in the network over the period of time. In another embodiment, the appliance may receive one or more messages from a group of endpoints about the additional behavior information of the suspect object. The set of correlation rules used by the appliance to correlate the behavior information collected from the endpoints may be enhanced to identify a pattern of object activity throughout the network. By collecting additional behavior information from multiple endpoints, the appliance may be provided with a large sampling of sophisticated object activity with which to correlate and obtain a more complete view of the activity pattern. In response to correlation of the behavior information, the appliance may then task one or more endpoints to monitor the suspect object to acquire further behavior information for correlation. The high level view of the exploit and its sophisticated activity and behaviors when running on the endpoints may advantageously enable the appliance to more accurately verify the exploit, e.g., as malware.

DESCRIPTION

Figure 1:
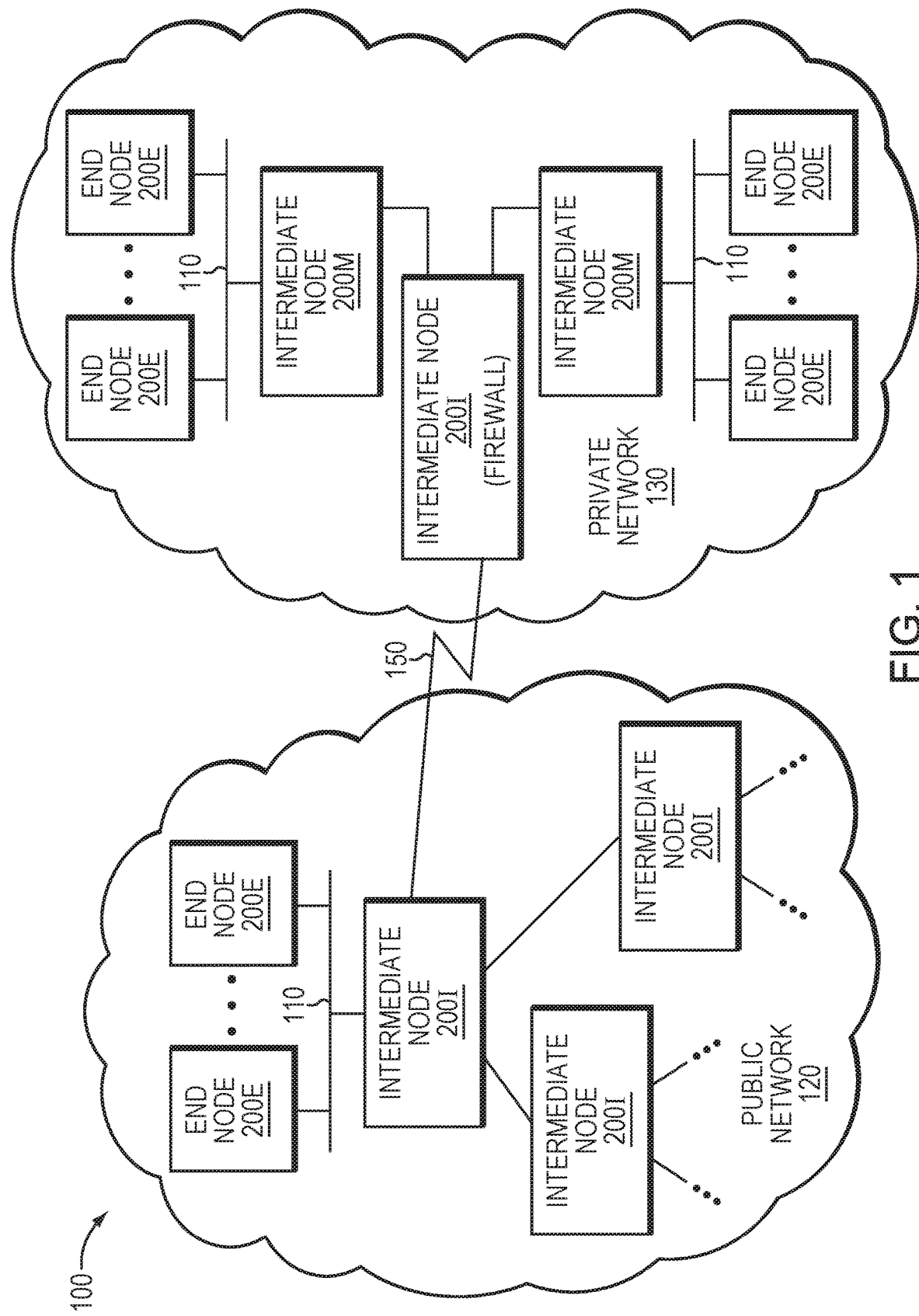
FIG. 1 is a block diagram of a network environment that may be advantageously used with one or more embodiments described herein.

FIG. 1 is a block diagram of a network environment 100 that may be advantageously used with one or more embodiments described herein. The network environment 100 illustratively includes a plurality of networks organized as a public network 120, such as the Internet, and a private network 130, such an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_1$ to form an internetwork of nodes, wherein the intermediate nodes $200_1$ may include network switches, routers and/or one or more malware detection system (MDS) appliances (intermediate nodes $200_M$) described further herein. As used herein, an appliance may be embodied as any type of general-purpose or special-purpose computer, including a dedicated electronic computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes $200_E$ which, in the case of private network 130, may be illustratively embodied as endpoints. Further, one or more security information and event manager (SIEM) appliances (not shown) may act as intermediaries for communication between the end nodes and the one or more MDS appliances, so as to facilitate distribution of information between end nodes and the MDS appliances in large scale networks, e.g., networks having a large number (thousands) of end nodes.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., communication traffic) according to a predefined set of protocols, such as the Transmission Control Protocol/Internet Protocol (TCP/IP); however, it should be noted that other protocols, such as the HyperText Transfer Protocol Secure (HTTPS), may be advantageously used with the embodiments herein. In the case of private network 130, the intermediate node $200_1$ may include a firewall or other network device configured to limit or block certain communication (network) traffic in an attempt to protect the endpoints from unauthorized users. Unfortunately, such conventional attempts often fail to protect the endpoints, which may be compromised.

Figure 2:
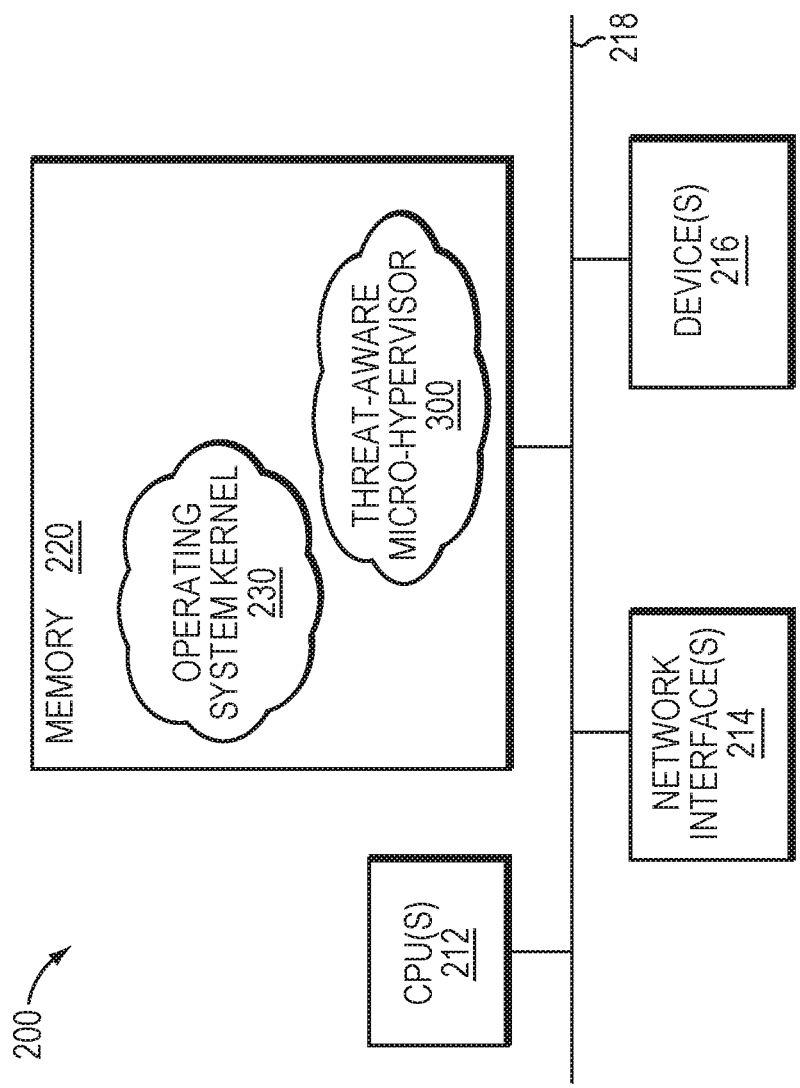
FIG. 2 is a block diagram of a node that may be advantageously used with one or more embodiments described herein.

FIG. 2 is a block diagram of a node 200, e.g., endpoint $200_E$ or MDS appliance $200_M$, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 214 may include one or more network ports containing the mechanical, electrical and/or signaling circuitry needed to connect the node to the network 130 to thereby facilitate communication over the network. To that end, the network interface 214 may be configured to transmit and/or receive messages using a variety of communication protocols including, inter alia, TCP/IP and HTTPS.

In one or more embodiments where the MDS appliance $200_M$ is communicatively coupled with the network 130, the network interface 214 may operate as a data capturing device (sometimes referred to as a "tap" or "network tap") that is configured to receive incoming network (data) traffic propagating from public network 120 and into private network 130, and provide at least some of this data traffic or a duplicated copy of the traffic for malware detection. In one embodiment, the MDS appliance may be positioned (deployed) behind the firewall at an ingress point into the private network 130, and at least partially in-line with network devices (e.g., endpoints) so as to capture and analyze the incoming traffic (e.g., through static analysis) and potentially block that traffic which is classified as malware from reaching an internal destination (e.g., the endpoints). In another embodiment, the static analysis may be at least partially performed by the firewall or other intermediate device, or performed by the network interface 214 (e.g., by CPU 212 and/or a digital signal processor on a network interface card).

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as threat-aware micro-hypervisor 300 as well as modules of malware detection architectures described herein, and manipulate the data structures. Exemplary CPUs may include families of instruction set architectures based on the x86 CPU and the x64 CPU.

An operating system kernel 230, portions of which are typically resident in memory 220 and executed by the CPU, functionally organizes the node by, inter alia, invoking operations in support of the software program code and application programs executing on the node. A suitable operating system kernel 230 may include proprietary and open source operating systems from a variety of commercial vendors or available publicly. Suitable application programs may include internet browsers, document viewers or browsers, word processors, email clients and the like as is known to persons of skill in the art. Illustratively, the software program code may be implemented as operating system processes of the kernel 230. As used herein, a process (e.g., a user mode process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer, e.g., application, programs stored in memory, alternative embodiments also include the code, processes and programs being embodied as engines and/or modules consisting of hardware, software, firmware, or combinations thereof.

Threat-Aware Micro-Hypervisor

Figure 3:
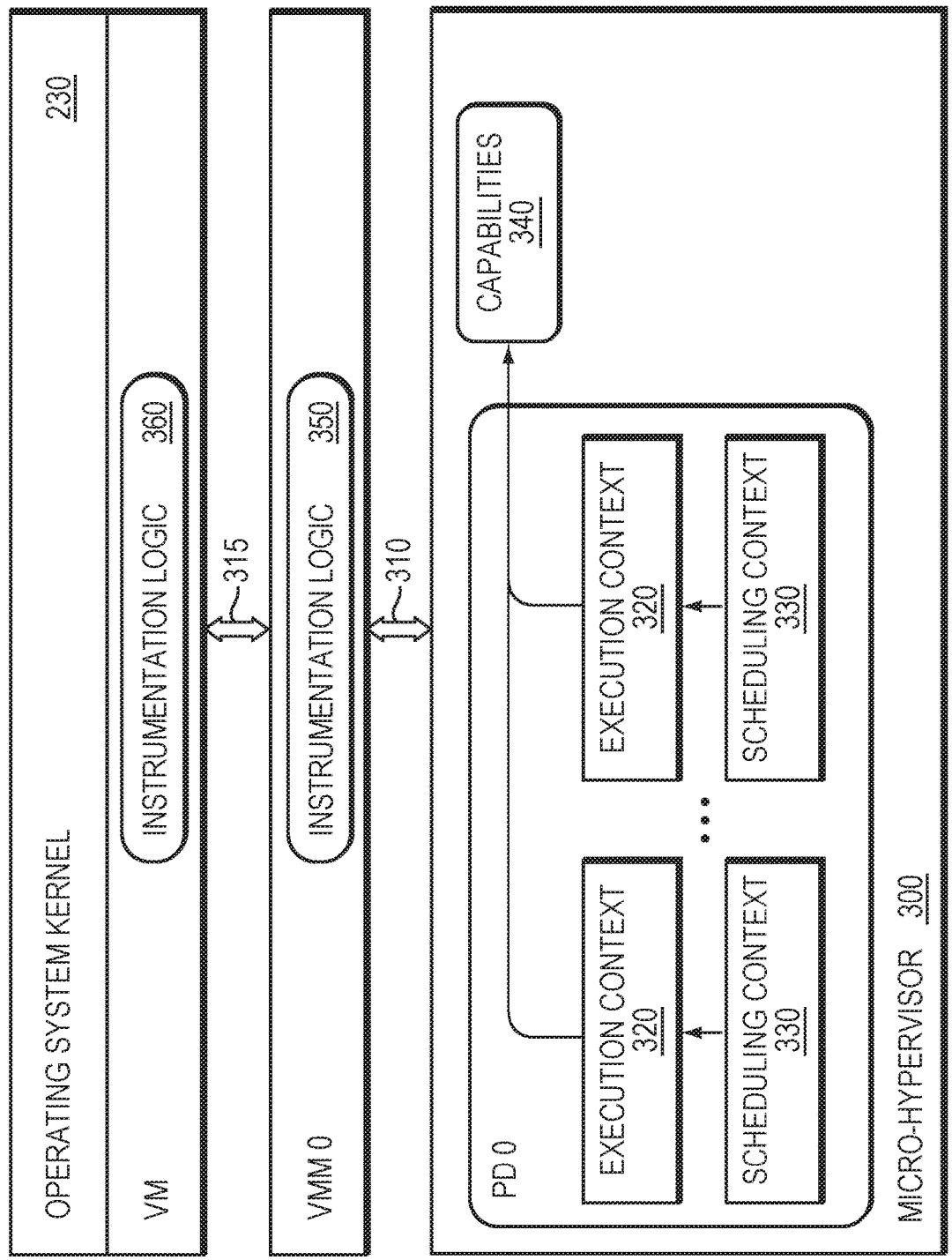
FIG. 3 is a block diagram of the threat-aware micro-hypervisor that may be advantageously used with one or more embodiments described herein.

FIG. 3 is a block diagram of the threat-aware micro-hypervisor 300 that may be advantageously used with one or more embodiments described herein. The threat-aware micro-hypervisor may be configured to facilitate run-time security analysis, including exploit and malware detection and threat intelligence, of operating system processes executing on the node 200. To that end, the micro-hypervisor may be embodied as a light-weight module disposed or layered beneath (underlying, i.e., directly on native hardware) the operating system kernel 230 of the node to thereby virtualize the hardware and control privileges (i.e., access control permissions) to kernel (e.g., hardware) resources of the node 200 that are typically controlled by the operating system kernel. Illustratively, the kernel resources may include (physical) CPU(s) 212, memory 220, network interface(s) 214, and devices 216. The micro-hypervisor 300 may be configured to control access to one or more of the resources in response to a request by an operating system process to access the resource.

As a light-weight module, the micro-hypervisor 300 may provide a virtualization layer having less functionality than a typical hypervisor. Therefore, as used herein, the micro-hypervisor 300 is a module (component) that underlies the operating system kernel 230 and includes the functionality of a micro-kernel (e.g., protection domains, execution contexts, capabilities and scheduling), as well as a subset of the functionality of a hypervisor (e.g., hyper-calls to implement a virtual machine monitor). Accordingly, the micro-hypervisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM. VMM 0 may thus instantiate the VM as a container for the operating system kernel 230 and its kernel resources. In an embodiment, VMM 0 may instantiate the VM as a module having instrumentation logic 360 directed to determination of an exploit or malware in any suspicious operating system process (kernel or user mode). Illustratively, VMM 0 is a pass-through module configured to expose the kernel resources of the node (as controlled by micro-hypervisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., the VM) and the micro-hypervisor over privileged interfaces 315 and 310.

The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the micro-hypervisor, VMM 0 or another virtual machine. Illustratively, VMM 0 may contain computer executable instructions executed by the CPU 212 to perform operations that initialize and implement the instrumentation logic 350, as well as operations that spawn, configure, and control/implement the VM and its instrumentation logic 360.

In an embodiment, the micro-hypervisor 300 may be organized to include a protection domain illustratively bound to the VM. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process) and, thus, is a representation of the process. Accordingly, the micro-hypervisor may provide a protection domain for the process and its run-time threads executing in the operating system. A main protection domain (PD 0) of the micro-hypervisor controls all of the kernel resources available to the operating system kernel 230 (and, hence, the user mode process) of the VM via VMM 0 and, to that end, may be associated with the services provided to the user mode process by the kernel 230.

An execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have a capability 340 that defines how the execution context 320 may reference that page. Illustratively, the capabilities may be examined by hardware (e.g., a hardware page fault upon a memory access violation) or by program code. A violation of a capability in a protection domain may be an interception point, which returns control to the VM bound to the protection domain.

Malware Detection Endpoint Architecture

Figure 4:
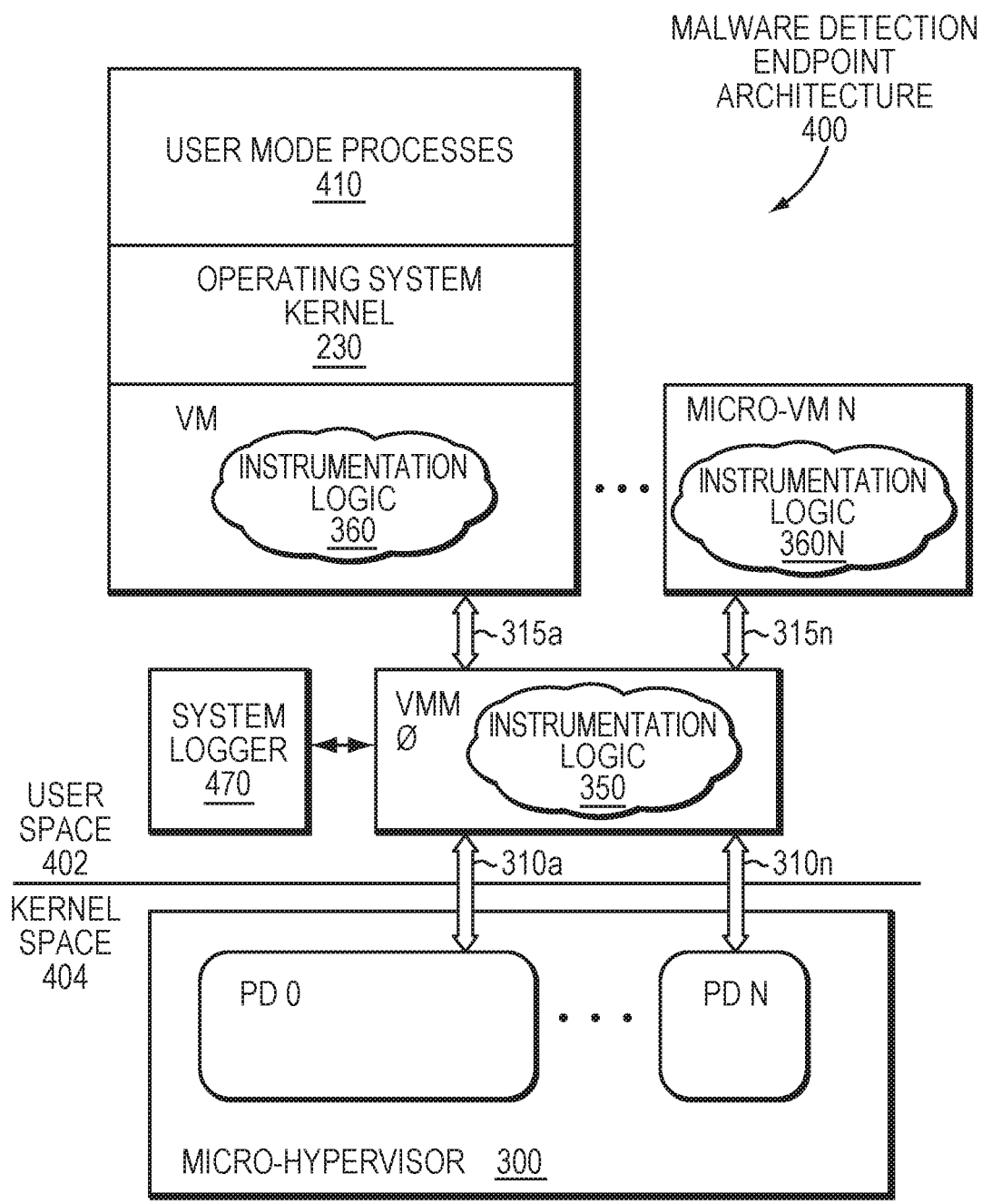
FIG. 4 is a block diagram of a malware detection endpoint architecture that may be advantageously used with one or more embodiments described herein.

In an embodiment, the threat-aware micro-hypervisor 300 may be deployed in a micro-virtualization architecture as a module of a virtualization system executing on the endpoint $200_E$ to provide exploit and malware detection within the network environment 100. FIG. 4 is a block diagram of a malware detection endpoint architecture 400 that may be advantageously used with one or more embodiments described herein. Illustratively, the architecture 400 may organize the memory 220 of the endpoint $200_E$ as a user space 402 and a kernel space 404. In an embodiment, the micro-hypervisor may underlie the operating system kernel 230 and execute in the kernel space 404 of the architecture 400 to control access to the kernel resources of the endpoint $200_E$ for any operating system process (kernel or user mode). Notably, the micro-hypervisor 300 executes at the highest privilege level of the hardware (CPU) to thereby virtualize access to the kernel resources of the endpoint in a light-weight manner that does not share those resources among user mode processes 410 when requesting the services of the operating system kernel 230. That is, there is one-to-one mapping between the resources and the operating system kernel, such that the resources are not shared.

A system call illustratively provides an interception point at which a change in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, instantiate (spawn) one or more "micro" virtual machines (VMs) equipped with monitoring functions that cooperate with the micro-hypervisor to detect anomalous behavior which may be used in determining an exploit or malware.

As used herein, an exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device (such as a node) and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe any technique that causes a malicious attack, and encompasses both malicious code and exploits detectable in accordance with the disclosure herein.

As used herein, the term "micro" VM denotes a virtual machine serving as a container that is restricted to a process (as opposed to the VM which is spawned as a container for the entire operating system). Such spawning of a micro-VM may result in creation of an instance of another module (i.e., micro-VM N) that is substantially similar to the VM, but with different (e.g., additional) instrumentation logic 360N illustratively directed to determination of an exploit or malware in the suspicious process by, e.g., monitoring its behavior. In an embodiment, the spawned micro-VM illustratively encapsulates an operating system process, such as a user mode process 410. A micro-VM may also be embodied as a memory view (as described herein). In terms of execution, operation of the process is controlled and synchronized by the operating system kernel 230; however, in terms of access to kernel resources, operation of the encapsulated process is controlled by VMM 0. Notably, the resources appear to be isolated within each spawned micro-VM such that each respective encapsulated process appears to have exclusive control of the resources. In other words, access to kernel resources is synchronized among the micro-VMs and the VM by VMM 0 rather than virtually shared. Similar to the VM, each micro-VM may be configured to communicate with the micro-hypervisor (via VMM 0) over privileged interfaces (e.g., 315n and 310n).

Whereas a micro-VM may be restricted to a guest process, the hardware resources used by that micro-VM, such as memory, may be accessed by a plurality of micro-VMs (and their respective guest processes). As noted, there is only one virtual machine (e.g., the VM) per guest operating system on the endpoint. Typically, the guest operating system running in the VM has one "view" of the memory 220, i.e., "guest-physical" memory (memory appearing as physical within the VM), corresponding to a memory management unit page table of the CPU 212 that provides access to the guest-physical memory as seen by that guest operating system running in the VM. Accordingly, a same page table (i.e., memory view) may be used by a plurality of guest processes, each contained in a separate corresponding micro-VM (i.e., memory view) that uses a same page table. However, additional views of memory may be created for each guest process, such as where every view corresponds to a different (i.e., separate) nested page table. Thus, different guest processes may view the guest-physical memory differently (e.g., with different translations or different permissions to the actual memory 220).

In an embodiment, the privileged interfaces 310 and 315 may be embodied as a set of defined hyper-calls, which are illustratively inter process communication (IPC) messages exposed (available) to VMM 0 and the VM (including any spawned micro-VMs). The hyper-calls are generally originated by VMM 0 and directed to the micro-hypervisor 300 over privileged interface 310, although the VM and the micro-VMs may also originate one or more hyper-calls (IPC messages) directed to the micro-hypervisor over privileged interface 315. However, the hyper-calls originated by the VM and the micro-VMs may be more restricted than those originated by VMM 0.

In an embodiment, the micro-hypervisor 300 may be organized to include a plurality of protection domains (e.g., PD 0-N) illustratively bound to the VM and one or more micro-VMs, respectively. For example, the spawned micro-VM (e.g., micro-VM N) is illustratively associated with (bound to) a copy of PD 0 (e.g., PD N) which, in turn, may be bound to the process, wherein such binding may occur through memory context switching. In response to a decision to spawn the micro-VM N, VMM 0 may issue a hyper-call over interface 310 to the micro-hypervisor requesting creation of the protection domain PD N. Upon receiving the hyper-call, the micro-hypervisor 300 may copy (i.e., "clone") the data structures (e.g., execution contexts, scheduling contexts and capabilities) of PD 0 to create PD N for the micro-VM N, wherein PD N has essentially the same structure as PD 0 except for the capabilities associated with the kernel resources. The capabilities for PD N may limit or restrict access to one or more of the kernel resources as instructed through one or more hyper-calls from, e.g., VMM 0 and/or micro-VM N over interface 310$n$ to the micro-hypervisor. Accordingly, the micro-hypervisor 300 may contain computer executable instructions executed by the CPU 212 to perform operations that initialize, clone and configure the protection domains.

Advantageously, the micro-hypervisor 300 may be organized as separate protection domain containers for the operating system kernel 230 (PD 0) and one or more operating system processes (PD N) to facilitate further monitoring and/or understanding of behaviors of a process and its threads. Such organization of the micro-hypervisor also enforces separation between the protection domains to control the activity of the monitored process. Moreover, the micro-hypervisor 300 may enforce access to the kernel resources through the use of variously configured capabilities of the separate protection domains. Unlike previous virtualization systems, separation of the protection domains to control access to kernel resources at a process granularity enables detection of anomalous behavior of an exploit or malware. That is, in addition to enforcing access to kernel resources, the micro-hypervisor enables analysis of the operation of a process within a spawned micro-VM to detect exploits or other malicious code threats that may constitute malware.

The user mode processes 410 and operating system kernel 230 may execute in the user space 402 of the endpoint architecture 400, although it will be understood to those skilled in the art that the user mode processes may execute in another address space defined by the operating system kernel. Illustratively, the operating system kernel 230 may execute under control of the micro-hypervisor at a privilege level (i.e., a logical privilege level) lower than a highest privilege level of the micro-hypervisor, but at a higher CPU privilege level than that of the user mode processes 410. In addition, VMM 0 and its spawned VMs (e.g., the VM and micro-VM N) may execute in user space 402 of the architecture 400. As a type 0 virtual machine monitor, VMM 0 (and its spawned VM and micro-VMs) may execute at the highest (logical) privilege level of the micro-hypervisor. That is, VMM 0 (and its spawned VM and micro-VMs) may operate under control of the micro-hypervisor at the highest micro-hypervisor privilege level, but may not directly operate at the highest CPU (hardware) privilege level.

Illustratively, the instrumentation logic of VMM 0 (and its spawned micro-VMs) may include monitoring logic configured to monitor and collect capability violations (e.g., generated by CPU 212) in response to one or more interception points to thereby infer an exploit or malware. Inference of an exploit or malware may also be realized through sequences of interception points wherein, for example, a system call followed by another system call having certain parameters may lead to an inference that the process sending the calls is an exploit or malware. The interception point thus provides an opportunity for VMM 0 to perform "light-weight" (i.e., limited so as to maintain user experience at the endpoint with little performance degradation) analysis to evaluate a state of the process in order to detect a possible exploit or malware without requiring any policy enforcement. VMM 0 may then decide to spawn a micro-VM and configure the capabilities of its protection domain to enable deeper monitoring and analysis (e.g., through interception points and capability violations) in order to determine whether the process is an exploit or malware. Notably, the analysis may also classify the process as a type of exploit (e.g., a stack overflow) or as malware and may even identify the same. As a result, the invocation of instrumentation and monitoring logic of VMM 0 and its spawned VMs in response to interception points originated by operating system processes and capability violations generated by the micro-hypervisor advantageously enhance the virtualization system described herein to provide an exploit and malware detection system configured for run-time security analysis of the operating system processes executing on the endpoint.

VMM 0 may also log the state of the monitored process within system logger 470. In an embodiment, the state of the process may be realized through the contents of the execution context 320 (e.g., CPU registers, stack, program counter, and/or allocation of memory) executing at the time of each capability violation. In addition, the state of the process may be realized through correlation of various activities or behavior of the monitored process. The logged state of the process may thereafter be exported from the system logger 470 to the MDS $200_M$ of the network environment 100 by, e.g., forwarding the state as one or more IPC messages through VMM 0 (VM) and onto a network protocol stack (not shown) of the operating system kernel. The network protocol stack may then format the messages as one or more packets according to, e.g., a syslog protocol such as RFC 5434 available from IETF, for transmission over the network to the MDS $200_M$.

Malware Detection Appliance Architecture

In one or more embodiments, the MDS appliance node (MDS) $200_M$ may be embodied as an intermediate node configured to analyze communication traffic associated with one or more endpoints $200_E$ coupled to a segment of a network, such as private network 130. The MDS appliance $200_M$ may be illustratively positioned (e.g., as an ingress/egress point) within the private network 130 or segment to intercept (i.e., snoop) the traffic. In one or embodiments, the MDS appliance may manage each endpoint by, e.g., requesting processing and instrumentation of the traffic by the endpoint $200_E$. The intercepted traffic may also be processed and instrumented (i.e., monitored) at the appliance. Thereafter, the instrumented traffic may be correlated at the MDS appliance $200_M$ to communicate the states of instrumentation between the endpoint $200_E$ and appliance. Note that such communication between the endpoint and MDS appliance may occur directly or indirectly via the SIEM acting as an intermediary. To that end, the MDS appliance may be configured to communicate with and instruct the endpoint to, e.g., perform an action and receive notification of that action. In an embodiment the MDS appliance may direct one or more endpoints to spawn a micro-VM having restricted capabilities (i.e., a restrictive memory view) to process and instrument the intercepted traffic and report results back (e.g., communicate collected states) to the MDS appliance. That is, the MDS appliance may determine that the intercepted traffic having a specific signature is potentially malicious and instruct the endpoint to process and instrument traffic matching that signature in a restrictive memory view. An example MDS appliance is described in U.S. patent application Ser. No. 14/962,497 titled Microvisor-Based Malware Detection Appliance Architecture, by Ismael, filed Dec. 8, 2015, which application is hereby incorporated by reference.

Illustratively, the MDS appliance $200_M$ may include functionality directed to processing of communication traffic and correlating instrumentation of that traffic with actions resulting from that traffic at the endpoints. For every network packet received, the appliance may run a heuristic to compute a flow, as appropriate, for the packet, and then create (spawn) a virtual machine (VM) to emulate an endpoint using an image of an operating system (guest operating system and one or more applications) configured to replicate a software processing environment of the endpoint, e.g., based on a payload (object) of the packet to be processed and instrumented. An object may include a logical entity such as, for example, a web page, an email or email attachment, an executable (i.e., binary or script), a file (which may contain an executable), or universal resource locator (URL). Information as to an appropriate processing environment may be provided by the packet itself, e.g., the packet header may identify the packet type, for example, a document such as a Portable Document Format (PDF) document and, thus, the processing environment may include a document reader. Additionally, or in alternative embodiments, information may also be provided by the endpoint (such as the destination endpoint as specified in the packet) to the MDS appliance indicating a type of application software (process) executing within the operating system on the endpoint. The appliance may then launch a copy of the application along with appropriate instrumentation to process each object. For example, assume the MDS appliance process HTTPS traffic received at the endpoint which executes, inter alia, an application (i.e., a web browser). The appliance may capture the communication (HTTPS) traffic destined to the endpoint, spawn the VM and launch a copy of the web browser along with instrumentation to monitor the traffic. Thereafter, the MDS appliance may communicate the state of the instrumentation to the endpoint, depending upon the captured traffic.

Figure 5:
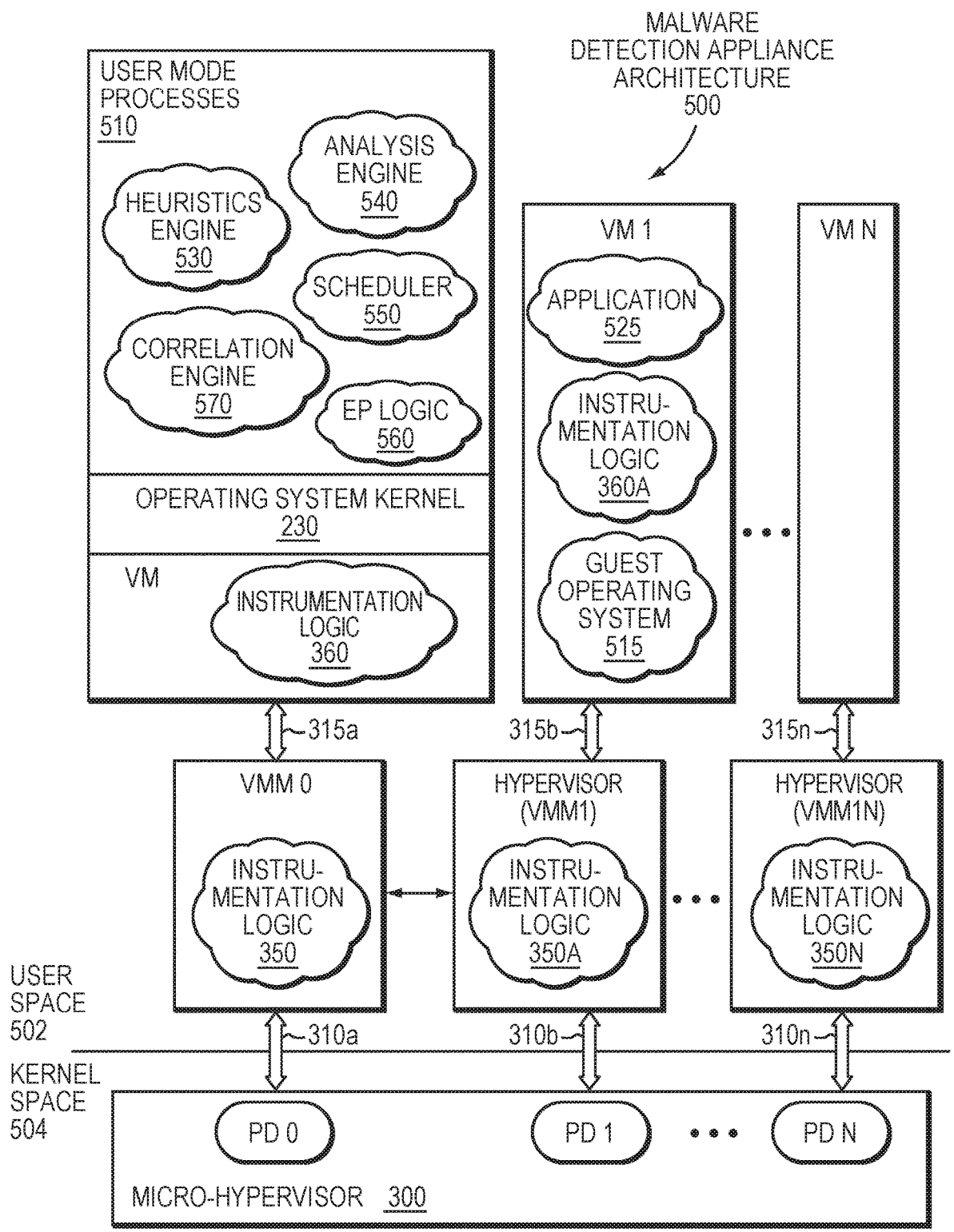
FIG. 5 is a block diagram of a malware detection appliance architecture that may be advantageously used with one or more embodiments described herein.

In an embodiment, the threat-aware micro-hypervisor 300 may be deployed in a virtualization architecture as a module of a virtualization system executing on the MDS appliance $200_M$ to provide exploit and malware detection within the network environment 100. FIG. 5 is a block diagram of a malware detection appliance architecture 500 that may be advantageously used with one or more embodiments described herein. Illustratively, the architecture 500 may organize the memory 220 of the MDS appliance $200_M$ as a user space 502 and a kernel space 504. The micro-hypervisor may underlie the operating system kernel 230 and execute at the highest privilege level of the CPU within the kernel space 504 of the architecture 500 to control access to the kernel resources of the appliance $200_M$ for any operating system process (kernel or user mode). User mode processes 510 and operating system kernel 230 may execute in the user space 502 of the appliance architecture 500. Illustratively, the operating system kernel 230 may execute under control of the micro-hypervisor at a privilege level (i.e., a logical privilege level) lower than a highest privilege level of the micro-hypervisor, but at a higher CPU privilege level than that of the user mode processes 510. In addition, VMM 0 and VM (e.g., VM) may execute in user space 502 under control of the micro-hypervisor at the highest micro-hypervisor privilege level, but may not directly operate at the highest CPU (hardware) privilege level.

One or more hypervisors, e.g., type 1 VMM (e.g., VMM 1), may be disposed as one or more modules over the micro-hypervisor 300 and operate in user space 502 of the architecture 500 under control of the micro-hypervisor at the highest micro-hypervisor privilege level to provide additional layers of virtualization for the MDS appliance $200_M$. Illustratively, each hypervisor provides full virtualization of kernel (hardware) resources and supports execution of one or more entire operating system instances (i.e., guest operating system) inside one or more full virtual machines. In one or more embodiments, the full virtual machine (VM) may simulate a computer (machine) based on specifications of a hypothetical (abstract) computer or based on an architecture and functions of an actual (real) computer. To that end, a hypervisor (e.g., VMM 1) may instantiate a full VM (e.g., VM 1) as a module provisioned with a software profile that includes a guest operating system (e.g., guest operating system 515) and any associated application programs (e.g., application 525), as well as instrumentation logic (e.g., instrumentation logic 360A) directed to determination of an exploit or malware in any suspicious object or application executing on the guest operating system. Illustratively, the hypervisor may instantiate the full VM from a pool of VMs configured to closely simulate various target operating environments (e.g., software profiles) in which the exploit or malware is to be analyzed. The software profile (e.g., guest operating system and/or application program) provisioned and configured in the VM may be different (e.g., in vendor, type and/or version) from the software profile provisioned and configured in other instantiated VMs (e.g., VM N).

Illustratively, each hypervisor (e.g., VMM $1\text{-}1_N$) may contain computer executable instructions executed by the CPU 212 to perform operations that initialize and configure the instrumentation logic (e.g., instrumentation logic 350A-N), as well as operations that spawn, configure, and control/implement the VM (e.g., VM 1-N) and their instrumentation logic (e.g., 360A-N). In an embodiment, there is illustratively one hypervisor (e.g., VMM $1\text{-}1_N$) for each VM (e.g., VMs 1-N), wherein each VM may be used to emulate an endpoint. The MDS appliance $200_M$ may not emulate every endpoint on the segment, but when a suspicious object (such as, e.g., a file of a network packet) is identified, the VMM 1 of the appliance may create (spawn) a full VM 1 to analyze that object. The virtualization layers of the MDS appliance $200_M$ may cooperate to implement an abstraction of virtual devices exposed as, e.g., virtual network interfaces to the VMs, as opposed to the real network interfaces exposed to the micro-VMs of the endpoint.

The user mode processes 510 executing on the MDS appliance $200_M$ may include a heuristic engine 530 that, in response to receiving communication traffic, is configured to run one or more heuristics to determine whether the traffic (i.e., an object of a packet) is suspicious. Illustratively, the heuristic engine may use pre-defined anomalous characteristics of verified exploits and malware to, e.g., identify communication protocol anomalies and/or suspect source addresses of known malicious servers. For example, the heuristic engine may examine metadata or attributes of the object and/or a code image (e.g., a binary image of an executable) of the object to determine whether a portion of the object matches a predetermined pattern or signature associated with a known type of exploit or malware. The heuristic engine 530 may provide the packet of the suspicious traffic to one or more processes 510 embodied as analysis engine 540. In an embodiment, the analysis engine 540 may be configured to perform static analysis of the object of the packet to, e.g., identify software profile information associated with an operating system instance for execution in a full VM (virtualizing all kernel resources). The analysis engine 540 may also be configured to analyze other content of the packet (e.g., destination address of a network header) to determine its destination (i.e., the endpoints). To that end, the analysis engine 540 may be configured to cooperate with a module, e.g., endpoint (EP) logic 560, to communicate to the endpoints $200_E$, e.g., to identify and/or acquire information (including the software profile) associated with execution of the exploit or malware on the endpoint. The analysis engine 540 may then provide the software profile information to another process embodied as scheduler 550, which may coordinate with the hypervisor, e.g., VMM 1, to spawn a VM, e.g., VM 1, to process the traffic. Note that the MDS appliance may instruct the endpoint to process the object in an micro-VM as soon as suspicion of the object as malware exceeds a predetermined threshold.

When processing the traffic, the analysis engine 540 may employ the EP logic 560 to invoke appropriate instrumentation logic 360A of VM 1 to enable communication with the endpoints to perform dynamic analysis and/or correlation of the suspicious object. In an embodiment, correlation (as described herein) may be performed by one or more user mode processes embodied as a correlation engine 570. The instrumentation logic 360A may be configured to monitor different types of objects, such as payloads of network (web) and email packets, although alternatively, there could be separate web-based and email-based MDS appliances, each of which may be deployed the same way and configured to perform that same work. The MDS appliance $200_M$ may include a module that communicates with a similar module on the endpoint to perform the requested instrumentation. For example in the case of email objects, the application may be an email reader that analyzes email traffic captured by the appliance (and endpoint).

Operationally, the MDS appliance may receive (i.e., intercept) and store traffic flowing over the network that is destined to the endpoints. The appliance may analyze the traffic and communicate with the endpoints over the network using a messaging protocol that encapsulates an object of interest (e.g., a file of a network packet). Illustratively, the MDS appliance may deploy a network protocol stack, e.g., of the operating system kernel 230 configured to employ a protocol to communicate with the endpoints. For example, the EP logic 560 may notify an endpoint to process the object using a network message having a MAC address of the endpoint (layer 2 connectivity). Alternatively, the message may include an IP address of the endpoint (layer 3 connectivity).

Correlation Between MDS Appliance and Endpoints

The embodiments herein provide a technique for verifying a determination of an exploit or malware in an object at the MDS appliance $200_M$ through correlation of activity, i.e., behaviors, of the object running on endpoints $200_E$ of the network. As noted, the MDS appliance may be illustratively positioned within the network to intercept communication traffic directed to the endpoints coupled to a segment of the network. The object may be included within, e.g., a payload of a packet associated with the communication traffic. The appliance may analyze the object to render a determination that the object is suspicious and may contain the exploit or malware. In response, the MDS appliance $200_M$ may pull from the endpoints (e.g., poll the endpoints to inquire) or receive a push (e.g., messages from the endpoints) as to whether any of the endpoints may have analyzed the suspect object and observed its behaviors. As noted previously, communication between the endpoints and the MDS appliance may occur directly or indirectly via the SIEM appliance that gathers events (e.g., messages) for bidirectional distribution to/from the MDS appliance and the endpoints.

In an embodiment, each endpoint $200_E$ may maintain a history of object behaviors (e.g., in system logger 470) that have been analyzed (i.e., monitored) and observed over a period of time (e.g., minutes or hours). The analyzed object behaviors (behavior information) may include inferences of the object as a type of exploit or malware, as well as evaluations of states of the object leading to a determination of the exploit or malware. The MDS appliance $200_M$ may poll the endpoints for their histories of behavior information associated with the suspect object. Alternatively, the appliance may receive one or more messages from a group of endpoints about their histories of behavior information associated with the suspect object. If the object's behaviors were analyzed and observed, the endpoints may provide the behavior information to the appliance, which may then invoke the correlation engine 570 to correlate that information, e.g., against correlation rules, to verify its determination of the exploit or malware. In addition, the appliance may task the endpoints to analyze the object, e.g., during run time, to determine whether it contains the exploit and provide the results to the appliance for correlation. Accordingly, the MDS appliance may verify its determination of an exploit within the object by correlating with the endpoints. Notably, SIEM appliance may correlate with the endpoints and communicate with the MDS so as to verify its determination of an exploit within the object.

Advantageously, maintaining a history of object behaviors enables verification (or validation) of states of the activity, e.g., of an object, that has been observed in the past. For example, assume that the micro-hypervisor and micro-VM allow an exploit or malware (within an object) to execute and analyze the object to observe that it has manifested certain states, e.g., creation of one or more files. The exploit or malware may thus be validated and observed using a generated signature of the exploit or malware. Upon obtaining sufficient information or completing the analysis, resources used to process the object at the micro-VM may be reallocated because there may be other objects, such as files of packets, that need analysis. Details of the states and behavior of the objects (files) may be recorded in the system logger 470 to thereby maintain a robust identifier and/or signature for the exploit or malware (object), as well as obtain improved forensic information.

In an embodiment, the MDS appliance $200_M$ may poll a selected group of endpoints $200_E$ in order to collect additional behavior information of the suspect object and correlate that information against a set of correction rules of the correlation engine 570 to provide a high level view of the exploit and any potential spreading of the exploit or malware (e.g., as an infection) in the network over the period of time. In another embodiment, the appliance may receive one or more messages from a group of endpoints about the additional behavior information of the suspect object. Such correlation may not be performed at a single endpoint because the views (histories) from many endpoints may be needed to detect a particular type of exploit as it progresses through various stages of behaviors. The high level view of the potential infection from the perspective of multiple endpoints may be needed to detect whether the object contains an exploit or malware. The set of correlation rules employed by the correlation engine 570 to correlate the behavior information collected from the endpoints may be enhanced to identify a pattern of object activity, e.g., a multi-phase attack, throughout the network. Often, an endpoint may experience only part of the multi-phased network attack by an object among many endpoints. For example, an exploit may exhibit delayed activation where one endpoint did not observe any manifestations of the attack by the object, while another endpoint may observe anomalous (malicious) behaviors of the exploit during analysis of the object. By collecting additional behavior information from multiple endpoints, the appliance $200_M$ may be provided with a large sampling of sophisticated object activity with which to correlate and obtain a more complete view of the activity pattern. In response to correlation of the behavior information, the appliance may then task one or more endpoints $200_E$ to monitor (instrument) the suspect object to acquire further behavior information for correlation and determination of the exploit.

The high level view of the exploit and its sophisticated activity and behaviors when running on the endpoints may advantageously enable the appliance $200_M$ to more accurately verify the exploit, e.g., as malware. As noted, correlation of behavior information of the object from many endpoints provides the appliance with more knowledge of the exploit and its potential to execute malware. The additional knowledge may lead the appliance to task those endpoints to provide even more information relating to specific events associated with the behavior of the object. Since an endpoint only has a "local" view of the object's behavior, the appliance may task the endpoints to monitor events and notify the appliance as to the observed behavior in response to those events.

As described herein, the micro-hypervisor 300 may be employed to detect unexpected behavior (or actions) by one or more operating system processes (e.g., application and/or object) executing in the operating system kernel 230 of the MDS appliance $200_M$ or endpoint $200_E$. The unexpected behavior of the process may be further tracked as suspicious. In response to a task, the micro-hypervisor 300 (via VMM 0 and a spawned micro-VM) of the endpoint may report to the MDS appliance that it has detected and identified an exploit or malware. Unlike VMM 0 which spawns the micro-VM as a container for light-weight (i.e., limited so to maintain user experience) analysis of the process, the MDS appliance $200_M$ includes full virtualized hardware via the hypervisor (VMM 1) that spawns a full (i.e., virtualizing all kernel resources) VM used to analyze the behavior of the operating system process executing on the endpoint. That is, the MDS appliance $200_M$ may be employed to provide more extensive instrumentation than can be provided by VMM 0 and its micro-VM of the endpoint.

In an embodiment, each VM of the appliance may include instrumentation logic (e.g., instrumentation logic 360A-N) having an instrumentation package that includes monitors although, in an alternative embodiment, the instrumentation package may be part of VMM 1. In terms of implementation, different types of instrumentation can attach to the VM. The VM may also be able to dynamically switch between different types of instrumentation at the appliance. Assume a particular type of instrumentation is executing that is relevant to a particular analysis. Subsequently, it may be determined that the instrumentation is not relevant and that some other instrumentation is desired, so the state of the analysis may continue but with a different type of instrumentation. Illustratively, a monitor is a type of instrumentation that monitors the behavior of software code at the micro-hypervisor level.

In an embodiment, the MDS appliance $200_M$ may be located at a periphery of the network, e.g., private network 130, or sub-network (segment) of the network. The location of the appliance may hinder its visibility to peer-to-peer communication traffic among the endpoints $200_E$. The lack of visibility may lead to spreading of the exploit (infection) among the endpoints where an initial infection at one endpoint may propagate among the other communicating endpoints. The initial infection may penetrate the network to one or more endpoints if it is not detected using, e.g., anti-virus (AV) signatures (indicators), exploit indicators and/or other behavioral indicators at the appliance. Once the infection penetrates the network (e.g., past the peripheral-based appliance $200_M$) the exploit may disrupt operation of the network. The verification technique described herein may obviate (prevent) any lateral propagation of the infection among the endpoints by enhancing the visibility of the exploit (e.g., its activity when running in the object) at the appliance $200_M$.

For example, upon verifying the exploit or malware in the object, the appliance may instruct the endpoints to terminate execution of the object and/or an associated operating system process containing the exploit. In response, the micro-hypervisor 300 of each endpoint may prevent lateral propagation of the infection by, e.g., closing network ports and terminating communication with other endpoints and appliances in the private network 130, and/or reporting an alert to an administrator (management) station of the network. Illustratively, the micro-hypervisor 300 may close network ports of the network interfaces 214 (kernel resources) by, e.g., closing any active programs using the ports to thereby terminate communication (i.e., the exchange of information) external to the endpoint. Alternatively, the management station may command the endpoint (via the micro-hypervisor) to terminate external communication in response to the alert (and until the endpoint is "cleansed"). The micro-hypervisor 300 may terminate such communication because of its fine-grained control over the kernel resources. For instance, the micro-hypervisor may terminate a malignant operating system process (or object) by, e.g., removing the process and its associated process control block from a process table.

The MDS appliance $200_M$ may seek further verification of the determination of the infection by tasking one or more selected endpoints $200_E$ running a type of potentially vulnerable software or having characteristics that may otherwise render the endpoints interesting to perform monitoring of the object. For example, an endpoint may be more isolated than other endpoints in the network so an infection may not spread as quickly, if at all. Alternatively, the endpoint may be located in a department of the private network or enterprise (e.g., a financial department) where advanced persistent threats (APTS) may be more prone to access sensitive information (e.g., a financial database). The MDS appliance $200_M$ may instruct the endpoints to monitor the object to detect and observe the exploit (or malware) as it runs (manifests) at the endpoints and then control (e.g., terminate) the infection to prevent lateral spreading among endpoints in the network.

In an embodiment, intelligence may be imparted into the selection of endpoints $200_E$ for verification, wherein the intelligence may include different software profiles such as different types of operating systems (with certain service packs) and/or different types of application programs executing on the endpoints that an exploit or malware of an object may be known to attack. In addition, such intelligence may determine whether identified exploit or malware may attack more than one type of vulnerability in an application executing the object on the endpoints. Certain exploit or malware may target certain software, particularly software with known vulnerabilities to a malware developer. The vulnerability may denote that the software (or feature of the software) is susceptible to attack; as a result, the feature may become a vulnerability. To that end, an inventory of endpoint configurations (software and hardware) including a database of associated vulnerabilities may be provided at the appliance. The appliance may poll (or receive messages) among endpoints with such different software profiles to provide behavior information of the object. The polled information (or messages received) from the endpoints may be correlated by the appliance against the inventory/database to essentially provide a distributed malware detection system. In response, tasks may be assigned to the endpoints to obtain further information that enables enhanced verification of the infection at the appliance. The endpoints $200_E$ may be selected based on software profiles that are conducive to detection of particular malware, which result in behaviors that may be easier to detect/observe.

Figure 6:
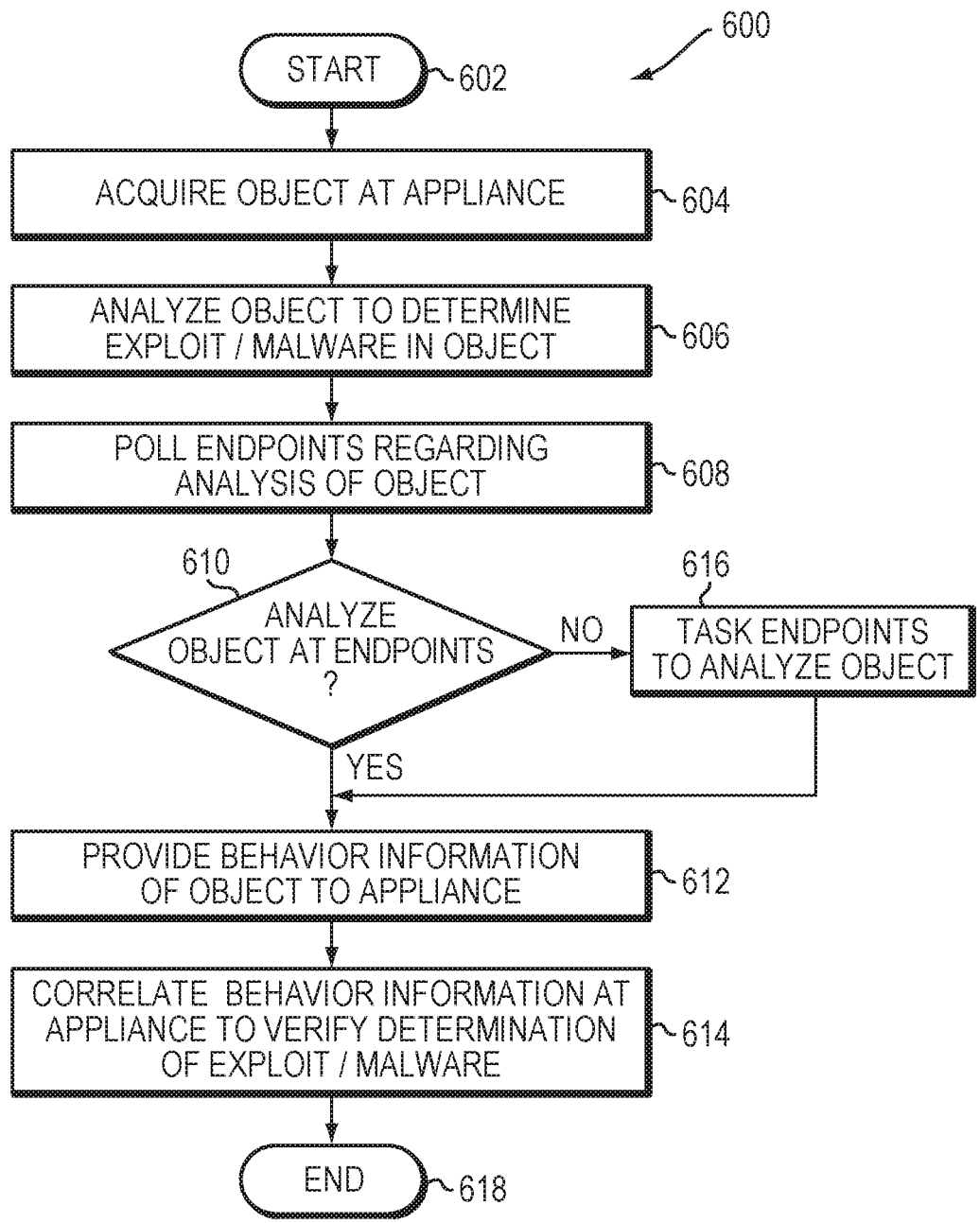
FIG. 6 is an example procedure for verifying an exploit or malware at a malware detection system appliance through correlation with one or more endpoints of the network.

FIG. 6 is an example procedure for verifying an exploit or malware at an MDS appliance through correlation with one or more endpoints of the network. Illustratively, communication traffic in the network may be directed to the endpoints, wherein the traffic may include one or more packets containing an object (e.g., within a payload of the packet). The procedure 600 starts at step 602 and proceeds to step 604 where the MDS appliance may intercept and acquire the object from the communication traffic, i.e., from its position within the network. At step 606, the appliance may perform analysis (e.g., static and/or dynamic analysis) on the object to render an initial determination that the object is suspicious and may contain the exploit or malware. At step 608, the MDS appliance may poll (or receive messages from) the endpoints with regards to analysis of the object, i.e., to inquire as to whether any of the endpoints may have analyzed the object. If the object was analyzed (step 610), the endpoints may provide observed behavior information to the appliance at step 612 and, at step 614, the appliance may correlate that information, e.g., against correlation rules, to verify its subsequent determination of the exploit or malware. If the object was not analyzed at the endpoints (step 610), the appliance may task the endpoints to analyze the object (step 616) to determine whether it contains the exploit or malware and, at step 612, the endpoints may provide the resulting behavior information of the object to the appliance. The procedure then ends at step 618.

While there have been shown and described illustrative embodiments for verifying a determination of an exploit or malware in an object at a MDS appliance through correlation of behavior activity of the object running on endpoints of a network, it is to be understood that various other adaptations and modifications may be made within the spirit and scope of the embodiments herein. For example, embodiments have been shown and described herein with relation to the appliance intercepting communication traffic containing the object for which the appliance rendered a determination of suspiciousness. However, the embodiments in their broader sense are not so limited, and may, in fact, provide a centralized database/repository configured to store and enable access to the object (e.g., one or more packets) present in the network during a specified time period.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

analyzing an object being processed within a virtual machine operating at an appliance coupled to a network, the appliance to render an initial determination whether the object is suspicious;

establishing communications by the appliance with a first plurality of endpoints coupled to the network to determine as to whether any of the first plurality of endpoints have analyzed the object;

responsive to a second plurality of endpoints of the first plurality of endpoints analyzing the object, receiving behavior information associated with analyses of the object at the second plurality of endpoints, wherein the second plurality of endpoints corresponds to or is a subset of the first plurality of endpoints; and correlating the behavior information provided by the second plurality of endpoints at the appliance against correlation rules to conduct a subsequent determination as to whether the object includes an exploit, and either (i) develop a more detailed view of the exploit based on additional behavior information collected by the second plurality of endpoints or (ii) identify a potential spreading of the exploit in the network.

2. The method of claim 1 wherein the analyzing of the object at the appliance comprises:
running one or more heuristics to determine whether the object is suspicious;
identifying software profile information associated with an operating system instance for execution in a virtual machine of the appliance; and
spawning the virtual machine to analyze the object using the software profile information.

3. The method of claim 1 wherein prior to analyzing the object, the method further comprises acquiring the object at the appliance by at least
intercepting a packet of communication traffic from the network, the packet having a payload including the object; and
analyzing content of the packet to determine a destination of the packet and object.

4. The method of claim 3 wherein the analyzing of the content of the packet comprises:
analyzing a destination address of a network header of the packet to determine an endpoint of the second plurality of endpoints being targeted as the destination of the packet; and
communicating with the endpoint to perform analysis and correlation of the object.

5. The method of claim 1 further comprising:
maintaining a history of behaviors at each of the first plurality of endpoints, the behaviors including inferences of the object as a type of one of exploit and malware, as well as evaluations of states of the object leading to a determination of the one of exploit and malware; and
providing the behaviors as the behavior information of the object to the appliance.

6. The method of claim 1 wherein the correlating of the behavior information comprises:
correlating the behavior information against the correction rules of a correlation engine of the appliance; and
identifying a pattern of object activity in the network.

7. The method of claim 6 further comprising:
collecting additional behavior information from the second plurality of endpoints at the appliance to provide a sampling of activities of the object to obtain the pattern;
tasking the second plurality of endpoints to monitor the object to acquire further behavior information for correlation and determination whether the object includes the exploit; and
preventing lateral propagation of the exploit as an infection among the first plurality of endpoints of the network.

8. The method of claim 7 wherein preventing the lateral propagation comprises:
instructing one or more of the second plurality of endpoints to terminate execution of the object containing the exploit; and
in response to the instructing of the one or more of the second plurality of endpoints, closing network ports at each endpoint to terminate communication with other endpoints and appliances in the network.

9. The method of claim 1 further comprising:
tasking at least one or more selected endpoints of the second plurality of endpoints running a type of potentially vulnerable software to perform monitoring of the object; and
acquiring further behavior information based on tasking of the at least one or more selected endpoints of the second plurality of endpoints for correlation and determination as to whether the object includes an exploit by a correlation engine.

10. The method of claim 9 further comprising:
providing intelligence associated with the one or more selected endpoints for verification, wherein the intelligence includes different types of one of operating systems and different types of application programs that the one of exploit and malware attacks; and
determining, based on the intelligence, whether the exploit attacks more than one type of vulnerability in an application executing on the one or more selected endpoints.

11. The method of claim 1 further comprising:
providing an inventory of endpoint software and hardware configurations including a database of associated vulnerabilities accessible by the appliance;
polling among second plurality of endpoints with different software profiles to provide the behavior information of the object to the appliance; and
correlating the polled behavior information against the database of associated vulnerabilities.

12. The method of claim 1 wherein the establishing of the communications with the first plurality of endpoints coupled to the network occurs in response to the initial determination indicating that the object is suspicious.

13. The method of claim 1 wherein prior to correlating the behavior information provided by the second plurality of endpoints at the appliance, the method further comprising:
responsive to none of the second plurality of endpoints analyzing the object, initiating, by the appliance, at least one endpoint of the second plurality of endpoints to analyze the object and receiving behavior information associated with an appliance-initiated analysis of the object at the second plurality of endpoints.

14. The method of claim 1, wherein the second plurality of endpoints is a subset of the first plurality of endpoints.

15. The method of claim 1 wherein the appliance constitutes a system or subsystem configured to manage exploit or malware detection.

16. A system comprising:
a memory configured to store a plurality of processes; and
a central processing unit (CPU) coupled to the memory and adapted to execute one or more processes of the plurality of processes, wherein the one or more processes when executed are operable to:
acquire an object;
analyze the object operating within a virtual machine to render an initial determination that the object is suspicious;
responsive to the object being suspicious, establish communications with endpoints coupled to a network to determine as to whether any of the endpoints have analyzed the object;
responsive to a plurality of endpoints of the endpoints analyzing the object, receive behavior information associated with the analyses of the object at the plurality of endpoints; and
correlate the behavior information provided by the plurality of endpoints to conduct a subsequent determination as to whether the object includes an exploit, and either (i) develop a more detailed view of the exploit based on additional behavior information collected by the plurality of endpoints or (ii) identify a potential spreading of the exploit in the network.

17. The system of claim 16 further comprising a hypervisor stored in the memory and executable by the CPU, the hypervisor and processes when executed further operable to:
 run one or more heuristics to determine whether the object is suspicious;
 identify software profile information associated with an operating system instance for execution in the virtual machine; and
 spawn the virtual machine to analyze the object using the software profile information.

18. The system of claim 17 wherein the processes when executed are further operable to:
 correlate the behavior information against a set of correction rules; and
 identify a pattern of object activity in the network.

19. The system of claim 18 wherein the processes, when executed, are further operable to:
 collect additional behavior information from the endpoints at the appliance to provide a sampling of activities of the object to obtain the pattern;
 task the endpoints to monitor the object to acquire further behavior information for correlation and determination whether the object includes the exploit; and
 prevent lateral propagation of the exploit as an infection among the endpoints of the network.

20. The system of claim 19 wherein the processes when executed are further operable to:
 instruct the endpoints to terminate execution of the object containing the exploit; and
 in response to the instructing of endpoints to terminate execution of the object, close network ports at each endpoint to terminate communication with other endpoints and appliances in the network.

21. The system of claim 20 wherein the processes when executed are further operable to:
 task one or more selected endpoints of the endpoints running a type of potentially vulnerable software to perform monitoring of the object; and
 acquire further behavior information from the one or more selected endpoints for correlation and determination, by a correlation engine, as to whether the object includes an exploit.

22. The system of claim 16 wherein the one or more processes establishing of the communications with the endpoints coupled to the network occurs in response to the initial determination indicating that the object is suspicious.

23. A non-transitory computer readable medium including program instructions for execution on one or more processors, the program instructions when executed operable to:
 acquire an object at an appliance coupled to a network;
 analyze the object operating within a virtual machine operating at the appliance to render an initial determination that the object is suspicious;
 responsive to the object being suspicious, establish communications with endpoints coupled to the network to determine as to whether any of the endpoints have analyzed the object;
 responsive to a plurality of endpoints of the endpoints analyzing the object, receive behavior information associated with the analyses of the object at the plurality of endpoints; and
 correlate the behavior information provided by the plurality of endpoints to conduct a subsequent determination as to whether the object includes an exploit, and either (i) develop a more detailed view of the exploit based on additional behavior information collected by the plurality of endpoints or (ii) identify a potential spreading of the exploit in the network.

24. A system in communication with a first plurality of endpoints over a network, the system comprising:
 a processor; and
 a memory communicatively coupled to the processor, the memory including software, when executed by the processor,
  conducting an analysis on an object being processed by a virtual machine operating within the system,
  rendering an initial determination whether the object is suspicious,
  communicating with the first plurality of endpoints to determine as to whether any of the first plurality of endpoints have analyzed the object,
  responsive to a second plurality of endpoints of the first plurality of endpoints has analyzed the object, receiving behavior information associated with analyses of the object at the second plurality of endpoints, wherein the second plurality of endpoints is a portion of the first plurality of endpoints, and
  correlate the behavior information provided by the second plurality of endpoints against correlation rules to conduct a subsequent determination as to whether the object includes an exploit, and either (i) develop a more detailed view of the exploit based on additional behavior information collected by the second plurality of endpoints or (ii) identify a potential spreading of the exploit in the network.

25. The system of claim 24, wherein the second plurality of endpoints is a subset of the first plurality of endpoints.

26. The system of claim 24, wherein the processor is configured to conduct the analysis of the object by at least run one or more heuristics to determine whether the object is suspicious, identify software profile information associated with an operating system instance for execution by the virtual machine, and generate the virtual machine to analyze the object using the software profile information.

27. The system of claim 24, wherein prior to conducting the analysis of the object, the processor being configured to at least acquire the object by at least intercepting a packet of communication traffic from the network, the packet having a payload including the object, and analyzing content of the packet to determine a destination of the packet and the object.

28. The system of claim 27, wherein the processor is configured to analyze the content of the packet by at least (i) analyzing a destination address of a network header of the packet to determine an endpoint of the one or more endpoints as the destination of the packet, and (ii) communicating with the endpoint to perform analysis and correlation of the object.

29. The system of claim 24, wherein prior to communicating with the first plurality of endpoints, the processor further configured to access a history of behaviors at each of the first plurality of endpoints, the behaviors including inferences of the object as a type of one of exploit and malware, as well as evaluations of states of the object leading to a determination of the one of exploit and malware.

30. The system of claim 24, wherein the processor to correlate the behavior information by at least:
 correlating the behavior information against the correlation rules of a correlation engine; and
 identifying a pattern of object activity in the network.

31. The system of claim 30, wherein the processor is further configured to (i) collect additional behavior information from the second plurality of endpoints to provide a sampling of the object to obtain a complete view of the pattern, (ii) determine whether the object includes the exploit based on analyses of the behavior information, and (iii) prevent lateral propagation of the exploit as an infection among the first plurality of endpoints of the network.

32. The system of claim 24, wherein the processor to further prevent lateral propagation of the exploit as an infection among the first plurality of endpoints of the network by at least instructing one or more of the second plurality of endpoints to terminate execution of the object containing the exploit; and in response to the instructing of the one or more of the second plurality of endpoints, closing network ports at each endpoint to terminate communication with other endpoints and appliances in the network.

33. The system of claim 24, wherein the memory further comprises software that, when executed, provides an inventory of endpoint software and hardware configurations including a database of associated vulnerabilities stored at the system, polls among second plurality of endpoints with different software profiles to provide the behavior information of the object to the system, and correlate the polled behavior information against the database of associated vulnerabilities.

\* \* \* \* \*